United States Patent [19]

Räthel

[11] Patent Number: 4,637,371
[45] Date of Patent: Jan. 20, 1987

[54] FUEL-OPERATED HEATING SYSTEM, PARTICULARLY AN AUXILIARY HEATER FOR A VEHICLE

[75] Inventor: Dieter Räthel, Mittelstetten, Fed. Rep. of Germany

[73] Assignee: Webasto-Werk W. Baier GmbH & Co., Fed. Rep. of Germany

[21] Appl. No.: 669,230

[22] Filed: Nov. 7, 1984

[30] Foreign Application Priority Data

Nov. 17, 1983 [DE] Fed. Rep. of Germany ....... 3341490

[51] Int. Cl.$^4$ ............................................... F24H 3/06
[52] U.S. Cl. ............................. 126/110 B; 122/182 S; 126/116 R; 165/147
[58] Field of Search ................ 165/135, 142, 155, 147; 237/12.3 C, 12 R; 431/25 B; 126/110 R, 110 B, 116 R, 110 C, 391; 122/182 S

[56] References Cited

U.S. PATENT DOCUMENTS

| | | | |
|---|---|---|---|
| 74,269 | 2/1968 | Anderson | 122/182 S |
| 1,734,310 | 11/1929 | Taylor | 122/182 S |
| 2,429,360 | 10/1947 | Kells | 126/391 |
| 3,060,922 | 10/1962 | Wilson | 126/391 |
| 3,236,044 | 2/1966 | Ruge | 237/12.3 C |
| 3,672,336 | 6/1972 | Joannes | 172/182 S X |
| 3,779,229 | 12/1973 | Volbehr | 126/110 B |
| 3,894,526 | 7/1975 | Kofink | 126/110 B |
| 3,970,072 | 7/1976 | Chipchase | 126/391 |
| 3,989,029 | 11/1976 | Friedl et al. | 126/110 B |
| 3,989,030 | 11/1976 | Friedl | 237/12.3 R |
| 4,329,943 | 5/1982 | Schworer | 122/182 S |

FOREIGN PATENT DOCUMENTS

| | | | |
|---|---|---|---|
| 363701 | 1/1921 | Fed. Rep. of Germany | 165/147 |
| 3800 | of 1886 | United Kingdom | 122/182 S |
| 15876 | of 1896 | United Kingdom | 122/182 S |

*Primary Examiner*—Samuel Scott
*Assistant Examiner*—H. A. Odar
*Attorney, Agent, or Firm*—Sixbey, Friedman & Leedom

[57] ABSTRACT

An auxiliary heater for a vehicle heating system of the type having a burner projecting into a combustion chamber delimited by a combustion tube from which combustion gases emerge and are introduced into an annular space through which the combustion gases flow in an opposite direction to an exhaust outlet, the annular space being bounded peripherally by a heat exchanger containing a heat-transferring medium, such as water. In order to improve the efficiency of such an auxiliary vehicle heater and to lower the temperature of the combustion gases leaving the exhaust outlet, the cross-sectional flow-through area of the annular space is reduced in the flow direction toward the exhaust outlet. Fins are provided which project into the annular space a distance that reduces in correspondence with the reduction in the cross-sectional area of the annular space. The reduction in the cross-sectional area of the annular space may be continuous or in steps.

18 Claims, 3 Drawing Figures

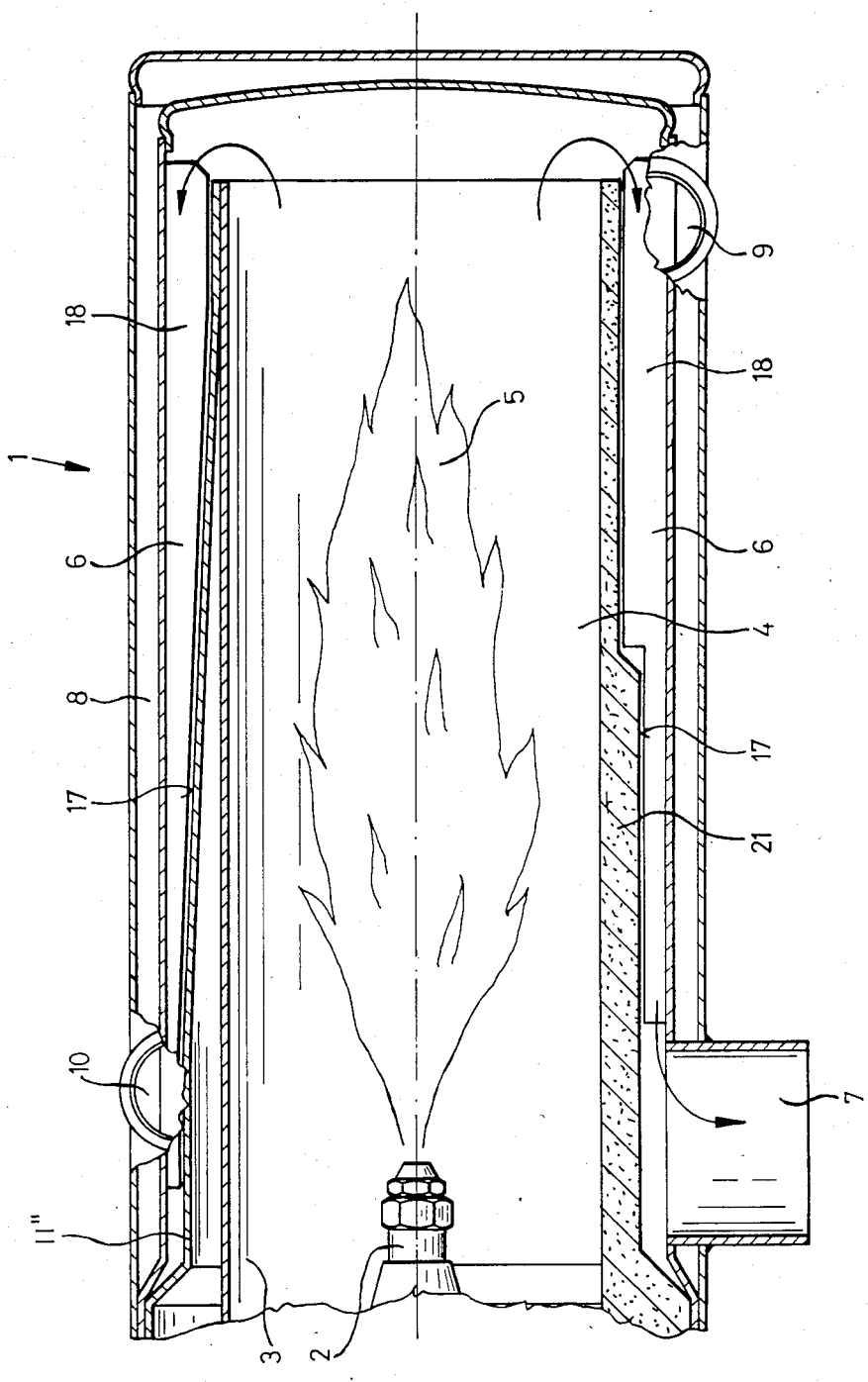

FUEL-OPERATED HEATING SYSTEM, PARTICULARLY AN AUXILIARY HEATER FOR A VEHICLE

BACKGROUND AND SUMMARY OF THE INVENTION

This invention relates to a fuel-operated heating system, particularly to an auxiliary heater for a vehicle, that has a burner projecting into a combustion chamber formed by a combustion tube and has a heat exchanger surrounding the combustion tube in a manner creating an annular space through which combustion gases are exhausted.

A fuel-operated heating system of the initially mentioned type is known as an auxiliary heater for vehicles from U.S. Pat. No. 4,216,759. In this case, projections are arranged on the outer surface of the wall surrounding the combustion chamber which reduce direct contact between the combustion gases flowing through the annular space and the peripheral wall of the combustion chamber. As a result, the combustion gases flowing through the annular space are deflected toward the heat exchanger and heated considerably less by the peripheral wall of the combustion chamber, without significant impairment of the heat radiation from the peripheral wall of the combustion chamber to the interior wall of the heat exchanger. The narrow points that are defined by the ends of the projections in the annular space result in a locally faster flow velocity permitting a better heat transfer. As a result, in the case of the known auxiliary vehicle heater, a relatively low exhaust gas temperature and a correspondingly high efficiency are obtained.

From German Pat. No. 29 48790, a jacket-type heat radiation tube is known that has a central combustion tube and a jacket tube concentrically surrounding the combustion tube with a space therebetween. The combustion gases coming out of the mouth of the combustion tube, via the space formed between the combustion tube and the jacket tube, flow back to the base of the jacket heat radiation tube. This ring-shaped space has a cross section that varies over the length of the combustion tube and preferably decreases from the mouth of the combustion tube in the direction of the base of the jacket heat radiation tube. As a result, a uniform emission of heat for the length of the jacket is possible without difficulty because the cross section of the ring-shaped space affects the heat transmission by convection. However, in the case of this jacket heat radiation tube, no heat transfer device is provided and only a uniform heat emission is to be achieved over the length of the jacket by the combustion gases returned to the base of the jacket heat radiation tube in the ring-shaped space.

From German Offenlegungsschrift No. 30 11 249, a flame tube of an oil gasification burner is known where the combustion tube is shorter than the jacket tube, and its input diameter is larger than its output diameter. By means of this design, an exhaust-gas quantity that is required for optimal gasification with respect to the supplied heating oil and fresh air is achieved so that, despite optimal combustion, pressure losses are minimal.

In the case of the fuel-operated heating system developed as an auxiliary heater for vehicles of that type in U.S. Pat. No. 4,216,759, it was found that the heat transmission in the area of the annular space through which the combustion exhaust gases flow varies extensively, an extremely intensive transmission taking place in the area at which the combustion gases enter into the annular space. On the other hand, in the area of the combustion gas outlet, the heat transmission is only minimal so that the combustion gas temperature in the area of the combustion gas outlet, especially in the case of an increased heating capacity of the heating system, cannot be sufficiently lowered to the desired extent so that a less favorable efficiency has to be accepted. If, as previously customary, the annular space, between its inlet side and its outlet side, has a cross section that remains the same, the heat transmission becomes worse, in the direction toward the gas outlet, because the volume of the combustion gases in the annular space becomes smaller as they cool so that the pressure of the gases is lowered and there is also a decrease in the velocity of the combustion gases.

The invention, therefore, has a primary objective to further develop a fuel-operated heating system, particularly an auxiliary heater for a vehicle of the described type, in such a way that the heat exchanger receives an optimized and uniform transmission of heat, so that the heating system, in the case of a lower and higher heating capacity, operates at a higher efficiency and the combustion gas temperature in the area of the combustion gas outlet can, therefore, be lowered.

According to preferred embodiments of the invention, a fuel-operated heating system, particularly an auxiliary heater, is provided that achieves the noted object by the cross section of the annular space, through which the combustion gases are exhausted, being narrowed in an out-flow direction. Also transference of heat between the combustion chamber and gases in the annular space may be shielded in correspondence with the narrowing thereof to prevent reheating thereof.

Because in the fuel-operated heating system according to the invention the cross section of the ring-shaped space through which the combustion gas flows becomes narrower or smaller in the direction of the combustion gas outlet, it is achieved that the area of the combustion gas outlet also actively participates in the transmission of heat to the heat exchanger so that the annular space can be fully utilized over its whole length to the exhaust outlet for the transfer of heat to the heat exchanger. The reason is that, among other things, the flow velocity of the combustion gas is also important for the heat transfer and it is increased because of the feature of the annular space, according to the invention, narrowing in cross section in the direction of the combustion gas outlet corresponding to the decrease in volume caused by cooling so that in the annular space there exists an approximately constant flow velocity from the inlet side to the outlet side. This results in a significantly better heat transmission and the exhaust gas temperature can be lowered significantly. Thus, it is possible, in the case of the heating system according to the invention, to obtain a better efficiency than previously obtainable in the case of a lower and higher performance requirement. Additionally, the combustion temperature at the exhaust outlet is also lowered. Moreover, these advantages are achieved, according to the invention, in such a way that the heating system can remain dimensionally unchanged.

According to one preferred embodiment of the invention, the cross section of the ring-shaped space narrows continuously toward the exhaust outlet, preferably by providing the annular space with a conical shape. In the case of such a continuous size reduction, local increases of flow velocity are avoided since the velocity increases continuously because of the narrowing of the cross section, from the inlet side of the annular space toward its outlet side. The flow friction losses are also very low in this case.

In the case of an alternative embodiment, the cross section of the ring-shaped space narrows in steps, preferably several steps, in the flow direction of the combustion gases through the annular space.

In either case, the narrowing of the cross section is achieved either by the fact that the combustion tube delimiting the combustion chamber is shaped in a complementary fashion with respect to the narrowing of the cross section, or that a conventional cylindrical combustion tube is used to define the combustion chamber, but the combustion tube is surrounded by an appropriately contoured top part. When a top part is arranged over the exterior wall of the combustion tube to narrow the annular space, the advantage is achieved, as compared to the use of a reshaped combustion tube, that the geometry of the combustion chamber may remain unchanged so that no threat of impairment of the combustion process in the combustion chamber, as a result of changing cross section of the combustion chamber, exists.

When a top part is used, this top may form a separate component that creates a space between the top part and the combustion tube into which combustion gases also enter and which shield against the heat radiating from the combustion tube to the combustion gas passing through the annular space, especially in proximity of the exhaust outlet. By this measure, it is, on the one hand, achieved that the combustion tube and thus the combustion chamber remain hotter so that more favorable combustion values are obtained, and that, on the other hand, the combustion gases, before coming out of the exhaust outlet, are not reheated by radiating heat.

On the other hand, the top part may also be arranged on the exterior wall of the combustion tube without clearance, so as to be firmly connected with it, and in order to ensure a compact construction. It is also possible to use a single part that corresponds configurationally to the combined combustion tube and top part, preferably made of a ceramic material, which simplifies manufacture and assembly.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 shows further embodiments where, in the upper half, a top part is fastened to the combustion tube and where, in the lower half, a single ceramic piece is used instead of the combined top part and combustion tube.

DETAILED DESCRIPTION OF THE PREFERRED EMBODIMENTS

Figure 1:
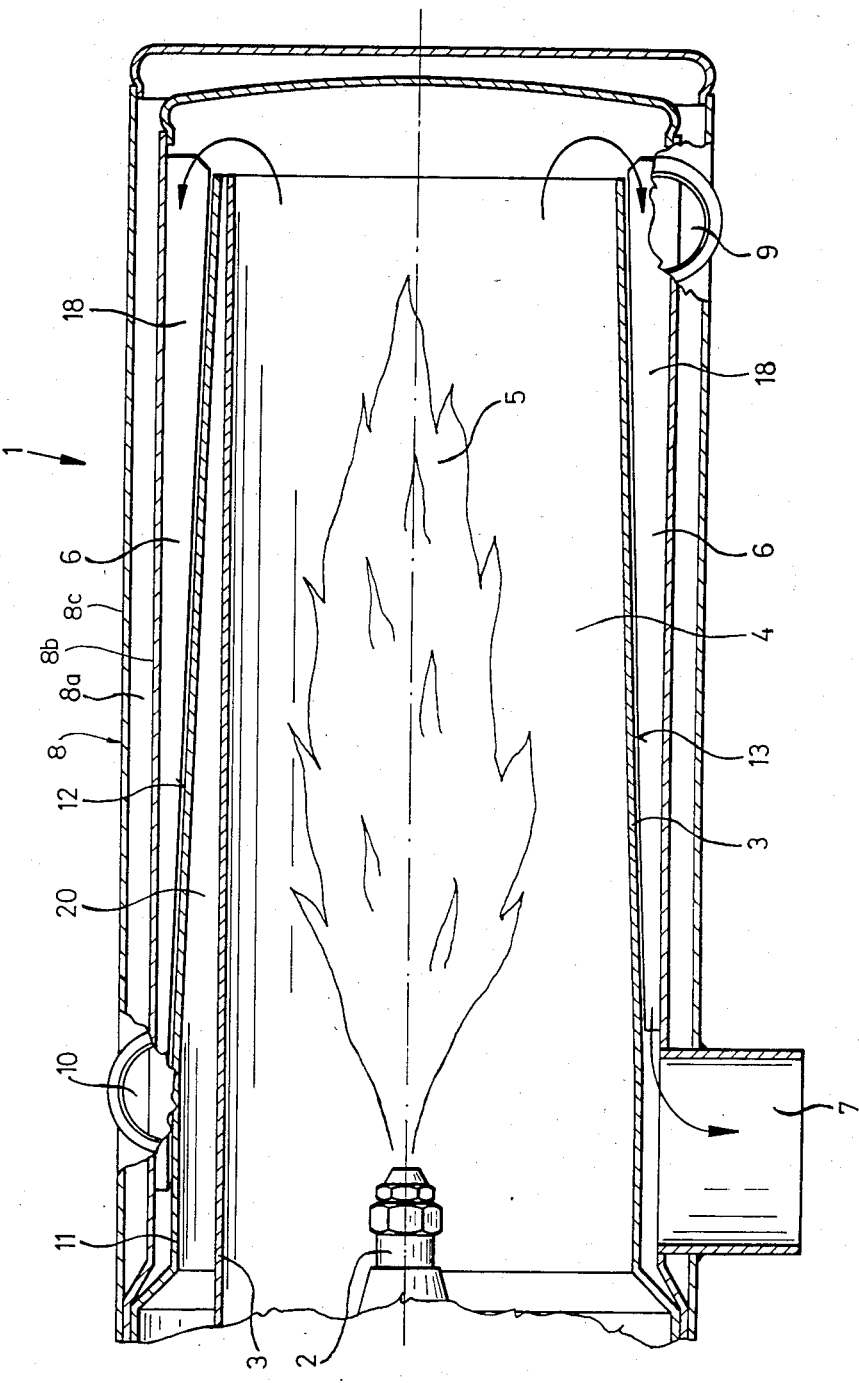
FIG. 1 is a diagrammatic sectional view of a fuel-operated heating system according to the invention wherein, in the upper half, an embodiment is shown having a top part arranged around the combustion tube to continuously reduce the cross section of a combustion gas out-flow space and, in the lower half, an embodiment is shown having the combustion tube, itself, shaped to produce the same effect.

In the figures of the drawing, identical parts have the same reference numbers, and corresponding, but modified, parts carry a prime designation.

FIG. 1 shows a fuel-operated heating system in the form of an auxiliary heater for a vehicle which, as a whole, has the reference number 1. The auxiliary heater for a vehicle has a burner 2 that is shown only in diagrammatic form and has corresponding supply lines (not shown). The burner 2 projects into a combustion chamber 4 that is defined peripherally by a combustion tube 3. A diagrammatic drawing of a flame in the combustion chamber 4 has the reference number 5. The combustion chamber 4 is surrounded by an annular space 6 through which the combustion gases produced during combustion are directed to an exhaust outlet 7 after their flow direction has been reversed, as indicated by the arrows at the end of the combustion chamber 4. The annular out-flow space 6, in a jacket-type fashion, is surrounded by a heat exchanger 8 having a chamber 8a defined between inner and outer walls 8b, 8c and through which a heat transfer medium, such as water, is fed via an inlet 9 and is discharged via an outlet 10. Fins 18 project from inner wall 8b of the heat exchanger 8 into the annular space 6.

As shown in FIG. 1, the cross section of the annular space 6 through which the combustion gases flow becomes narrower in the direction from the end of the combustion chamber toward exhaust outlet 7. In the case of the embodiments shown in FIG. 1, the cross section of the annular space 6 narrows continuously, preferably in a conical fashion. In the upper half of FIG. 1, a top part 11 surrounds a combustion tube 3 of cylindrical shape, said top part 11 having a conical shape and its outer wall 12 forms the inner wall of the annular out-flow space 6.

In the case of the embodiment shown in the lower half of FIG. 1, the combustion tube 3' is formed in the shape of a truncated cone and its exterior wall 13 forms the conical inner wall of the annular out-flow space 6. The part of the truncated cone that has the smallest diameter is provided in the area of the end of the combustion chamber 4 that faces away from the burner 2, while the part of the truncated cone that has the largest diameter is located in the area of the end of the combustion chamber 4 that receives the burner and is in proximity to the area of the exhaust outlet 7.

Figure 2:
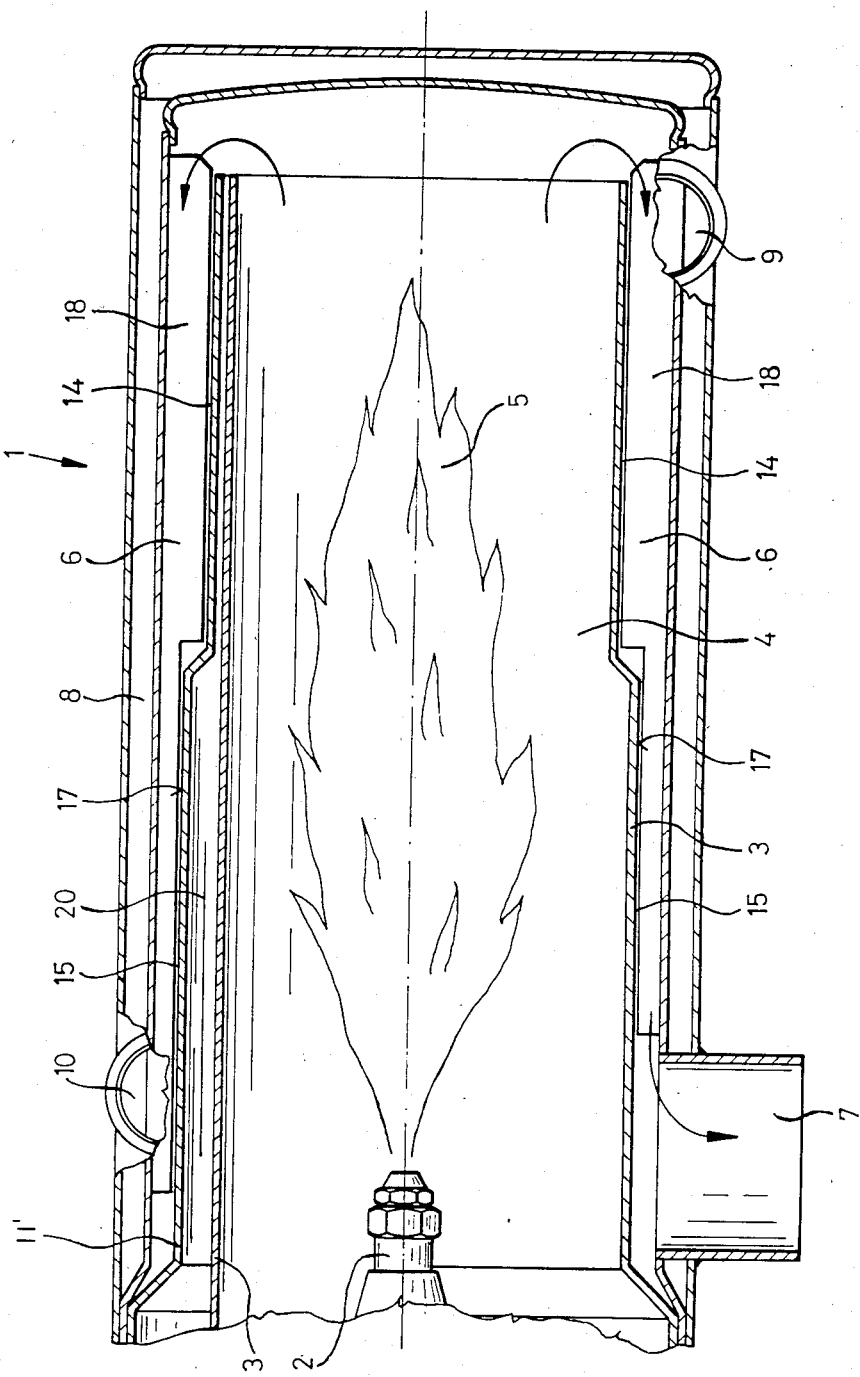
FIG. 2 shows modified embodiments of the fuel-operated heating system according to the invention where, similar to FIG. 1, in the upper half, a top part is provided surrounding the combustion tube, while in the lower half, the combustion tube, itself, is correspondingly shaped but, in contrast to the embodiments of FIG. 1, a stepped change in cross section is achieved.

As a modification of the embodiments according to FIG. 1, FIG. 2 shows embodiments where the cross section of the annular space 6 becomes narrower in steps in the direction toward the exhaust gas outlet 7. In FIG. 2, two steps 14, 15 are shown. Naturally, three or more steps may also be provided. It is even possible that one step may be sufficient.

In the upper half of FIG. 2, the step-shaped narrowing of the cross section of the annular out-flow space 6 is achieved by the fact that a top part 11' is arranged around the cylindrical combustion tube 3, said top part 11' having the steps 14, 15. The lower half of FIG. 2, on the other hand, shows an embodiment where a combustion tube 3", itself, has the steps 14, 15 so that the inner wall 17 of the annular space 6 is formed directly by the exterior wall surface of the combustion tube 3".

If, as shown in the upper halves of FIG. 1 and 2, the top part 11, 11' is provided, a shield space 20 exists between the exterior wall of the combustion tube 3 and top part 11, 11' into which combustion gases enter via the end facing away from the burner 2. These combustion gases in the space 20 shield against the radiation of heat from the exterior wall of the combustion tube 3 to the flow of combustion gases through annular out-flow space 6. As a result, the combustion tube 3 remains hotter, and the combustion in the combustion chamber 4 can take place under more favorable conditions. Also, the combustion gas flowing to the exhaust outlet 7 is not reheated, through heat radiation, before leaving the vehicle heater 1, so that the combustion gas temperature in the area of the combustion gas outlet 7 is lower.

In the case of the embodiment in the upper half of FIG. 3, the top part 11" is fastened onto the exterior wall of the combustion tube 3, while the lower half of FIG. 3, as an example, shows an embodiment having a one-piece component instead of the top part 11, 11', 11" and the cylindrical combustion tube 3. The one-piece component, as a whole, has the reference number 21 and is, preferably, made of a ceramic material to shield the out-flowing gases from the temperature of the combustion chamber 4 in a manner similar to that achieved by shield space 20. Naturally, the cross section of the annular space 6, in this case also, may narrow continuously or in a stepped manner corresponding to those shown in either of FIGS. 1 and 2.

In all embodiments shown in the drawing, the fins 18 taper height-wise complementary to the narrowing of the cross section of the ring-shaped space 6. Furthermore, as is apparent from the foregoing, with the exception of the embodiments shown in the lower half of FIGS. 1 and 2, in all embodiments the combustion chamber 4 has a constant diameter substantially throughout its length yet the radial distance between the annular out-flow space 6 and the combustion chamber 4 (which is determined by the top part 11, shield space 20 and combustion tube 3 in the embodiments of the upper half of FIGS. 1–3 or the thickness of combustion tube in the embodiment of the lower half of FIG. 3) is increased in direct proportion to the reduction in flow-through area of the annular out-flow space by the means that decreases the ability for heat to be transferred between the combustion chamber 4 and the annular out-flow space 6.

In the following, the method of operation of the vehicle heater 1 according to the invention is explained in detail. The combustion gases formed during the combustion in the combustion chamber 4 leave the combustion tube 3 at its open end that faces away from the burner 2 and, as indicated by arrows, are rerouted into the annular space 6 in opposite direction. In the annular space 6, heat is transmitted from the combustion gases to the heat-transferring medium, such as water, with heat exchanger 8.

Since the cross section of the annular out-flow space 6, starting from its inlet end, in the direction toward exhaust outlet 7, narrows either continuously (see FIGS. 1 and 3) or in steps (see FIGS. 2 and 3), the flow velocity in the annular space 6, starting from its inlet end, in the direction toward the exhaust outlet, can be kept almost constant, so that, also, the area in the proximity of the exhaust outlet 7 can be utilized effectively for transferring heat to the heat exchanger 8 in order to achieve improved efficiency. By means of this improved heat transfer to the heat exchanger 8, the temperature of the combustion gases leaving through the exhaust outlet 7 can be lowered significantly, especially where the gases are shield by shield space 20 or ceramic tube 21, as well. In this manner, the vehicle heater 1 is optimized with respect to its heat transfer operation so that the efficiency, in the case of lower and higher heating capacity requirements, can be improved in comparison to previous systems of this type and a reduced temperature of the combustion gases leaving the vehicle heater 1 is achieved. In the case of the previous vehicle heaters, the efficiency in the case of a low heating capacity is about 80% and when the heating capacity is increased, falls to about 75%. In the case of the vehicle heater 1 according to the invention, on the other hand, the efficiency, in the case of an increased heating capacity, is at about 80% and, in the case of a lower heating capacity, increases to about 85%, i.e., a full 5% increase in efficiency is achieved regardless of the heating capacity.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

What is claimed is:

1. An auxiliary heater for vehicles having a burner projecting into a first end of a combustion chamber formed by a combustion tube having an open end, located opposite said first end, from which combustion gases produced by said burner flow out of the combustion chamber; a heat exchanger having an inner chamber for a heat transfer medium and surrounding the combustion tube in a jacket-like manner with an annular out-flow space being located therebetween for directing combustion gases coming out of an open end of the combustion tube, in a flow direction from said open end toward said first end of the combustion tube, to an exhaust outlet in heat exchange realtionship with the heat transfer medium within said heat exchanger; and longitudinally extending fins projecting from a wall of said heat exchanger into said annular out-flow space; wherein the cross-sectional flow-through area of the annular out-flow space is reduced in a direction from said open end of the combustion tube toward said exhaust outlet by increasing the diameter of a boundary wall defining the inner circumference of the out-flow space; wherein the fins project a distance which decreases in correspondence to the reduction of said cross-sectional, flow-through area; and wherein the combustion chamber has a constant diameter substantially throughout its length and wherein a radial distance between said annular out-flow space and said combustion chamber is increased in direct correspondence to the reduction in flow-through area of the annular out-flow space along with a decrease in the ability for heat to be transferred from said combustion chamber to said annular out-flow space.

2. An auxiliary heater according to claim 1, wherein the boundary wall is formed by the exterior of the combustion tube and the combustion tube is a one-piece ceramic tube having a wall thickness that increases in correspondence to the reduction of the cross-sectional area of the annular out-flow space, thereby decreasing the ability for heat to be transferred from the combustion chamber to the annular out-flow space.

3. An auxiliary heater according to claim 1, wherein the boundary wall is formed by a top part that surrounds an exterior wall of the combustion tube.

4. An auxiliary heater according to claim 3, wherein the decreasing of the ability for heat to be transferred from the combustion chamber to said annular out-flow space is achieved by a shield space that exists between the top part and the exterior wall of said combustion tube, said space being closed tightly at its end in the area of the burner.

5. An auxiliary heater according to claim 3, wherein said shield space is open at an end in the area of the open end of the combustion tube.

6. An auxiliary heater according to claim 1, wherein the cross-sectional area of the annular out-flow space is provided with at least one step-wise reduction in flow-through area.

7. An auxiliary heater according to claim 6, wherein the boundary wall is formed by the exterior of the combustion tube and the combustion tube is a one-piece ceramic tube having a wall thickness that increases in correspondence to the reduction of the cross-sectional area of the annular out-flow space.

8. An auxiliary heater according to claim 6, wherein the cross-sectional area is reduced by a plurality of steps successively provided in a direction of flow toward said exhaust outlet.

9. An auxiliary heater according to claim 6, wherein the boundary wall is an exterior wall of the combustion tube and the combustion tube is a sheet metal tube of a diameter that increases in correspondence with the reduction of the cross-sectional area of the annular out-flow space.

10. An auxiliary heater according to claim 6, wherein the boundary wall is formed by a top part that surrounds an exterior wall of the combustion tube.

11. An auxiliary heater according to claim 10, wherein said shield space is open at an end in the area of the open end of the combustion tube.

12. In auxiliary heater according to claim 10, wherein a shield space exists between the top part and the exterior wall of said combustion tube, said space being closed tightly at its end in the area of the burner.

13. An auxiliary heater according to claim 1, wherein the cross-sectional area of the annular out-flow space progressively decreases in size throughout its length from the open end of the combustion tube to said exhaust outlet.

14. An auxiliary heater according to claim 13, wherein said boundary wall conically increases in diameter in the direction toward said exhaust outlet.

15. An auxiliary heater according to claim 14, wherein the boundary wall is formed by the exterior of the combustion tube and the combustion tube is a one-piece ceramic tube having a wall thickness that increases in correspondence to the reduction of the cross-sectional area of the annular out-flow space.

16. An auxiliary heater according to claim 14, wherein the boundary wall is formed by a top part that surrounds an exterior wall of the combustion tube.

17. An auxiliary heater according to claim 16, wherein the decreasing of the ability for heat to be transferred from the combustion chamber to said annular out-flow space comprises a shield space that exists between the top part and the exterior wall of said combustion tube, said space being closed tightly at its end in the area of the burner.

18. An auxiliary heater according to claim 16, wherein said shield space is open at an end in the area of the open end of the combustion tube, thereby decreasing the ability for heat to be transferred from the combustion chamber to the annular out-flow space.

* * * * *